US007119979B2

(12) United States Patent
Fong et al.

(10) Patent No.: US 7,119,979 B2
(45) Date of Patent: Oct. 10, 2006

(54) MEASUREMENT OF SLIDER CLEARANCE BY INDUCING COLLISION OF THE SLIDER WITH DISK SURFACE

(75) Inventors: Walton Fong, San Jose, CA (US); Donald Ray Gillis, San Jose, CA (US); Bernhard E. Knigge, San Jose, CA (US); Remmelt Pit, Cupertino, CA (US); Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/882,882

(22) Filed: Jun. 30, 2004

(65) Prior Publication Data

US 2006/0002001 A1    Jan. 5, 2006

(51) Int. Cl.
    *G11B 21/02*  (2006.01)
(52) U.S. Cl. ....................................................... 360/75
(58) Field of Classification Search .................. 360/75
    See application file for complete search history.

(56) References Cited

U.S. PATENT DOCUMENTS

| 5,567,864 A | 10/1996 | Coon et al. |
| 5,673,110 A | 9/1997 | Erickson et al. |
| 6,417,981 B1 | 7/2002 | Smith |
| 6,590,667 B1 | 7/2003 | Lee et al. |
| 2001/0035960 A1 | 11/2001 | Johnston |
| 2002/0001151 A1 | 1/2002 | Lake |
| 2002/0071196 A1 | 6/2002 | Chapin et al. |
| 2002/0097517 A1 | 7/2002 | Bonin et al. |
| 2002/0176185 A1 | 11/2002 | Fayeulle et al. |
| 2003/0007279 A1 | 1/2003 | Johnson et al. |
| 2003/0058559 A1 | 3/2003 | Brand et al. |
| 2003/0067698 A1 | 4/2003 | Dakroub et al. |
| 2005/0105203 A1* | 5/2005 | Zhu et al. ..................... 360/75 |

OTHER PUBLICATIONS

J. Xu and R. Tsuchiyama, "Ultra-low-flying-height design from the viewpoint of contact vibration", Tribiology International 36 (2003), pp. 459-466.

* cited by examiner

*Primary Examiner*—David Hudspeth
*Assistant Examiner*—Mitchell Slavitt
(74) *Attorney, Agent, or Firm*—G. Marlin Knight

(57) ABSTRACT

A method for measuring the clearance of a slider over a rotating disk by inducing a collision between the slider and the disk is described. After the normal flying height of the slider is established, the slider is driven into a collision with the rotating disk surface by applying a DC or AC voltage between the slider and the disk. The clearance data can be extracted from the induced collision by measuring a parameter, such as the change in the amplitude of the readback signal from the magnetic sensor, which is related to fly-height at the normal fly-height and at the disk surface. The two data points can then be used to derive the clearance. One embodiment uses a single beam interferometer to derive the vibrational displacement of the collision event.

14 Claims, 5 Drawing Sheets

MEASUREMENT OF SLIDER CLEARANCE BY INDUCING COLLISION OF THE SLIDER WITH DISK SURFACE

FIELD OF THE INVENTION

The invention relates to methods for measuring parameters of sliders and disks used in magnetic storage devices, and more particularly to measuring the clearance of sliders flying over a disk.

BACKGROUND OF THE INVENTION

In a typical prior art magnetic disk recording system 10 as illustrated in FIG. 1 a slider 13 containing magnetic transducers for reading 14 and writing (not shown) magnetic transitions is urged toward the rotating disk 16 by a suspension (not shown). The magnetic sensor 14 is flanked by shields S1 and S2. As the disk rotates an air-bearing develops under the slider and causes it to fly. The distance between the slider and the disk surface is the clearance. The disk 16 typically includes a thin film overcoat 17 and a set of thin films 18 which include one or more ferromagnetic layers in which information is recorded. A disk drive can contain multiple disks and multiple sliders.

A lower slider fly-height is required for higher areal densities. Fly-heights of less than 7 nm are needed. Accordingly, it is becoming increasingly difficult to measure the actual fly-height of sliders. The most common technique using white light interferometry works adequately for a fly-height above 10 nm, but it looses accuracy below 10 nm. In addition, it is very sensitive to the optical constants of the slider overcoat. Another technique uses small solid bumps of known height on the disk and measures the acoustic emissions as the slider passes over or hits the bumps. Since it has proved impractical to make bumps below 5 nm in height, this particular technique looses accuracy for very small fly-heights.

In published U.S. patent application 20030067698 (Apr. 10, 2003) by Dakroub, et al. a method is described for measuring the fly-height of a slider using a fixed source write signal applied to an inductive element of the write head, generating a magnetic field with a stray magnetic field portion. A magnetoresistive element of the read head coupled with the magnetic field produces an initial field strength signal. As the disk rotates, the slider flies above the disk decreasing the density of the stray magnetic field portion, thereby, decreasing the amplitude of the field strength signal. The decreasing amplitude of the field strength signal is calibrated to a predetermined operating fly-height profile to correlate fly-height of the slider to the decreasing amplitude of the field strength field.

A method for measuring the fly-height of a slider using a thermal source and a thermal detector is described in published U.S. patent application 20030058559 (Mar. 27, 2003) by Brand, et al.

A laser diode generates light which is reflected off of the disk to a semiconductor laser light detector in the system described in published U.S. patent application 20030007279 (Jan. 9, 2003) by Johnson, et al.

In published U.S. patent application 20020176185 (Nov. 28, 2002) Fayeulle, et al., a method for measuring the fly-height of a slider using a disk with radial grooves in the surface is described. As the disk rotates, the radial grooves pass under the slider and induce a perturbation in the signal. By measuring the perturbations in the signal caused by the grooves in the disk surface, and by processing the measurement signal, a vertical spacing signal proportional to the vertical spacing between the disk and the head can be obtained.

In published U.S. patent application 20020071196 (Jun. 13, 2002) by Chapin, et al., a fly-height measurement is made measuring the frequency of the read/write head in response to perturbation of the gap between the read/write head and the data storage surface to invoke a dynamic response in the read/write head. A numerical model describing a functional interrelationship between the fly-height and the read/write head frequency is used. The method is described in a bench-top embodiment which uses a laser doppler vibrometer for measuring the dynamic response. The laser doppler vibrometer can be equipped with a quad-cell supplement on the laser apparatus in order to determine the pitch and roll of the slider as well. A disk drive embodiment is also described wherein the drive is able to make a self-measurement of the fly-height and take failure prevention actions is the results indicate an imminent failure. The perturbations described include a film of varying thickness on the disk, such as a Langmuir-Blodgett fluid film. It is suggested that the speed of the rotating disk can be modulated to effect a desired perturbation. Also, the inherent microwaviness of a disc can be used if sufficient to invoke resonance in the slider. In one embodiment an acoustic emissions sensor is used to determine the dynamic response of the slider to a known perturbation.

In published U.S. patent application 20020097517 (Jul. 25, 2002) by Bonin, et al., a slider is described with a field emission sensor that senses fly-height. The sensor has an electrode tip disposed on the slider. The electrode tip faces a media surface across a gap. The sensor conducts a tunneling current through the gap and provides an output representing the length of the gap.

Published U.S. patent application 20020001151 Jan. 3, 2002 by, J. H. Lake describes a system for measuring fly-height of a slider over a rotatable magnetic disk. The system determines the fly-height of the slider based on the measured pulse width and amplitude of the read back signal.

In published U.S. patent application 20010035960 (Nov. 1, 2001) by M. M. Johnston a method is presented of fly-height testing using a light emitting diode which generates a light that is reflected off the medium and the slider. The reflected light is directed to detectors capable of generating an electrical signal based on the amplitude of at least one wavelength of light in the reflected light. A distance calculator then determines the distance from the slider to the medium based on the electrical signal.

Interferometers including single beam interferometers which measure phase change of the returning light are commercially available. One such device is manufactured under the brand name Polytec and is called a "Digital LDV." In the following the term interferometer is used in the description of some embodiments and refers to a single beam interferometer. Other suitable types of interferometers can be used and preferably should have the capability of measuring low frequency changes.

SUMMARY OF THE INVENTION

A method is presented for measuring the clearance of a slider over a rotating disk by inducing a collision between the slider and the disk. The normal flying height of the slider is established by operating the disk drive or test stand to achieve a stable fly height. The slider is then driven into a collision with the rotating disk surface by applying a DC or AC voltage between the slider and the disk. The collision is typically nondestructive since the duration is very short. The clearance data can be extracted from the induced collision by measuring a parameter, such as the change in the amplitude of the readback signal from the magnetic sensor, which is related to fly-height at the normal fly-height and at the disk surface. The two data points can then be used to derive the clearance. One embodiment uses a single beam interferometer to derive the vibrational displacement of the collision event. By forcing a transition of the slider from a normal flying height to a collision with the disk the method creates a vibrational event that can be measured by the interferometer and from which the displacement can be derived. The displacement during the transition event is the clearance of the slider. The technique is extremely sensitivity at very low fly-heights (less than 7 nm) and can achieve accuracy which is significantly better than the accuracy of prior art white light interferometry. In a second embodiment the change in the amplitude of the readback signal from the magnetic sensor is used with the Wallace Spacing Loss Equation to convert the change in amplitude into a distance which is the clearance. A disk drive is described which uses the readback signal to make a self-measurement of the clearance of its sliders by including means to apply the voltage to the suspension and to detect the collision point in the signal from the magnetic sensor.

DETAILED DESCRIPTION OF THE INVENTION AND THE PREFERRED EMBODIMENTS

The method of the invention is useful for testing sliders during design or manufacturing. Testing of the flying characteristics of sliders during a design phase or during manufacturing is typically done after the slider has been integrated into a suspension.

Figure 1:
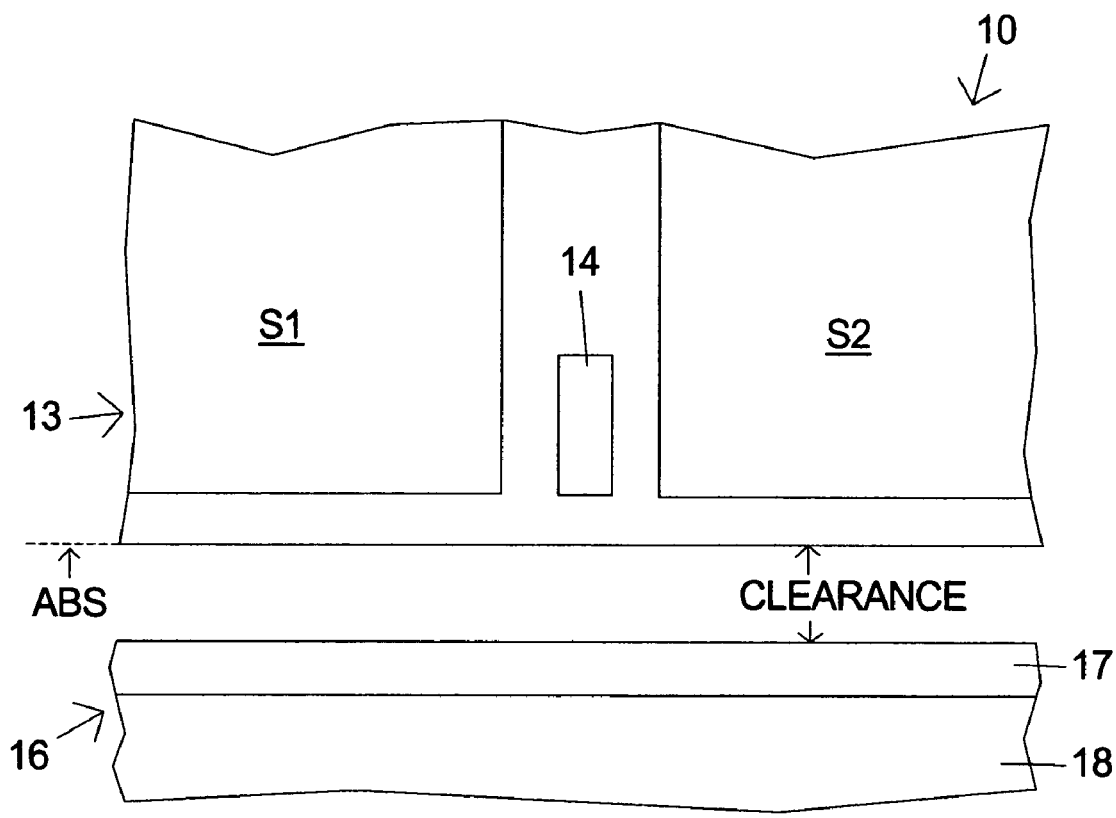
FIG. 1 is an illustration of selected components of a prior art disk drive illustrating the clearance between the slider and the disk.
Figure 2:
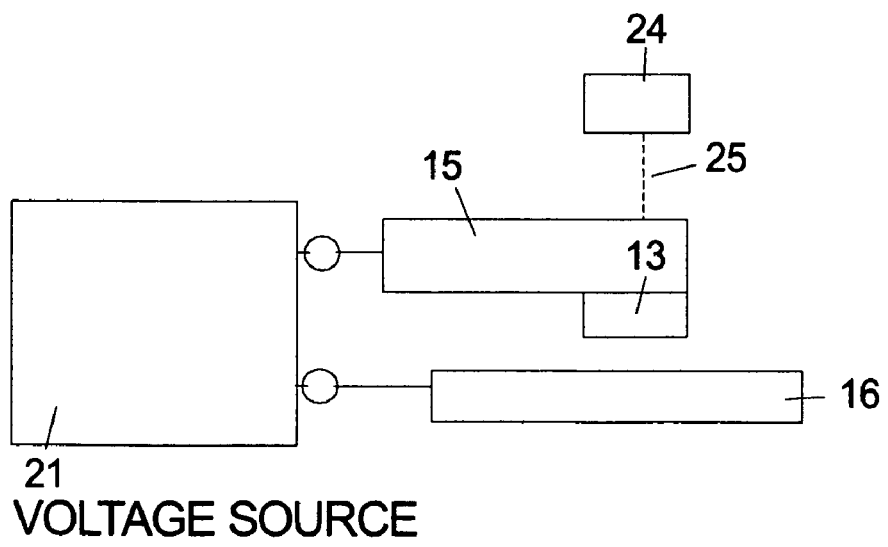
FIG. 2 is an illustration of a test setup for measuring the clearance of a slider according to an embodiment of the invention.

FIG. 2 illustrates a setup for the clearance measurement using an interferometer 24 according to the invention. A voltage source 21 is connected between the suspension 15 on which slider 13 is mounted and disk 16. The testing can be performed on slider and disk in a standard disk drive with some alterations. In a completed disk drive the suspension 15 and the disk 16 are typically connected to a common ground. This ground connection for the slider must be broken to allow a voltage to develop across the air-bearing between the slider and the disk. The electrical connections to the slider 13 are made through the suspension 15 which supports the slider. The measurement can also be made in test fixture where the suspension is electrically isolated.

Whether in a test fixture or a disk drive the normal fly-height of the slider is established by rotating the disk at designed RPM, for example, 7 k rpm. The slider is held over a selected track so that the laser beam 25 of the interferometer can be directed onto the top trailing end of the slider. Since the slider is mounted in a suspension, the beam will be directed onto the top surface of the slider through a gap or window in the suspension. The trailing edge is conventionally the point nearest to the disk surface and the height at that point is conventionally defined as the fly-height. The front-edge of the slider can be significantly higher off of the disk than the trailing edge. Even though the method of the invention induces the slider to collide with the disk surface, the collision is typically nondestructive since the duration is kept very short. Proper selection of the voltages and timing allow the measurement to be made with damaging the system. The short duration of the event also means that it is not necessary to filter out the run-out component of the disk that might otherwise skew the measurement.

Figure 3:
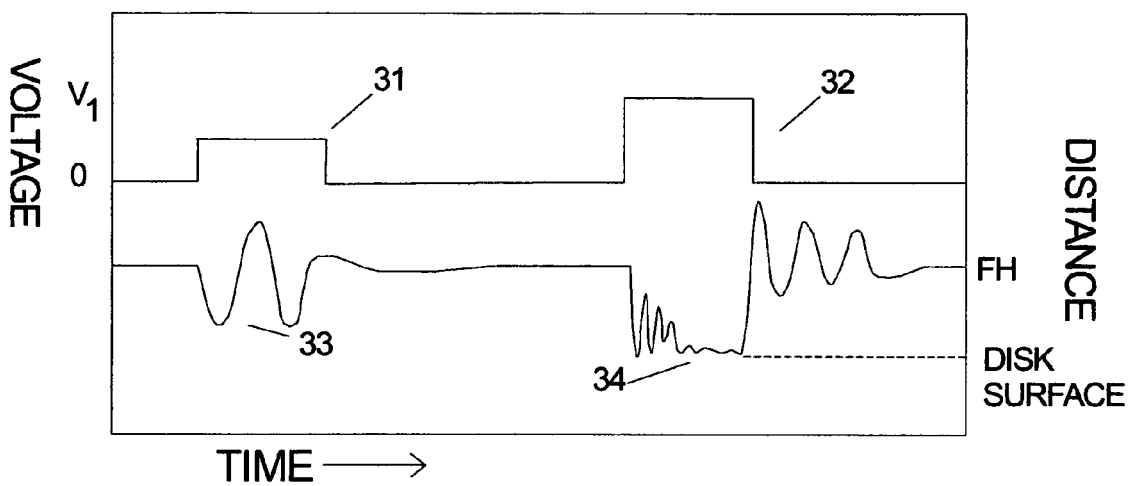
FIG. 3 is a graph illustrating the applied voltage and displacement of the slider using a DC pulse according to the invention.

After a stable flying regime has been established, a voltage is applied to the suspension to cause the slider to collide with the surface of the disk. In one method the voltage is a single DC pulse as shown in FIG. 3. The top line in the graph of FIG. 3 is the voltage applied to the suspension 15. The bottom line in the graph of FIG. 3 is the relative displacement of slider 13 as derived from the interferometer. The interferometer directly measures phase changes, so the actual displacement is calculated using standard techniques. In the following the interferometer is described as measuring the displacement as a shorthand description of the end result of making the appropriate mathematical calculations on the interferometer output. The voltage required to cause the slider to hit the disk is empirically determined. In the example given in FIG. 3 a first voltage pulse 31 is applied and the corresponding displacement 33 is observed to be a smooth response with no limit being encountered. The second, higher voltage pulse 32 is applied with maximum voltage $V_1$. Observation of the resulting displacement 34 reveals that the slider hit the disk as indicated by flattened bottom of the displacement graph. This limit in the displacement measurement is then known to be the zero reference point as indicated in the graph scale on the right. The displacement between the stable fly-height (FH) and the disk surface is the clearance. For disk drives with 7 k rpm rates and fly-heights below 10 nm, the value of $V_1$ can be expected to on the order of a few volts. Each slider design will have a limit of the voltage that can be applied with damage and the maximum voltage that can be applied places an upper limit on the nondestructive measurement. For example, if the maximum voltage is three (3) volts, then clearance of less than 7 nm can realistically be measured nondestructively.

The detection of the point where the slider hits the disk can be made in a variety of ways. As indicated above direct observation of the interferometer measurement is one way. Additional detection methods include use of acoustic sensors or friction measurement.

Figure 4:
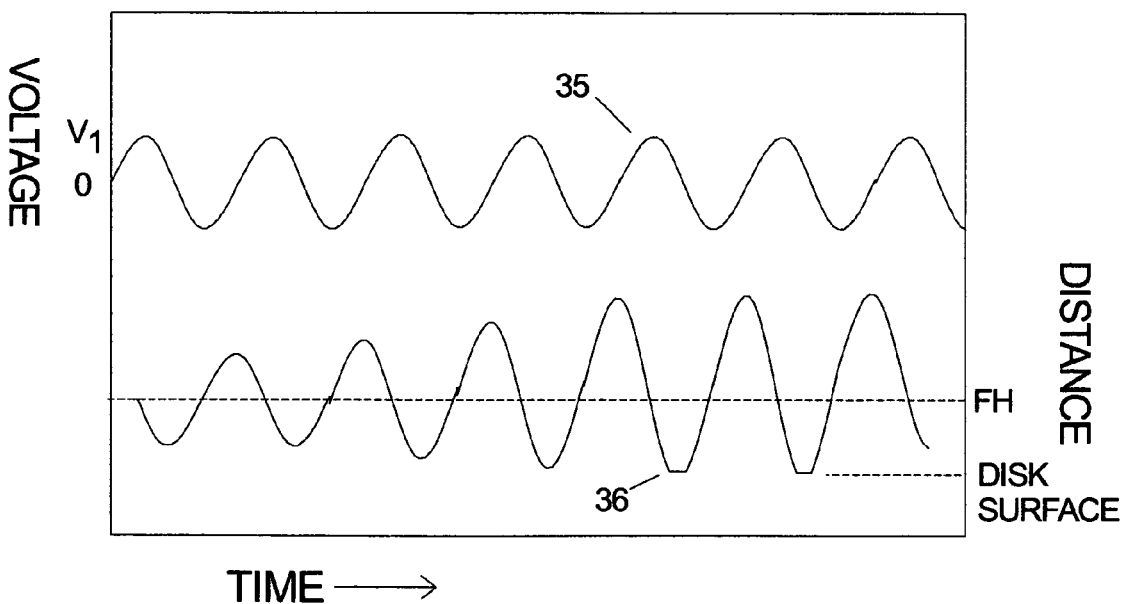
FIG. 4 is a graph illustrating the applied voltage and displacement of the slider using an AC signal according to the invention.

A second method of applying the voltage to the suspension 15 uses an AC signal. The top line in the graph of FIG. 4 is the AC voltage applied to the suspension 15. The bottom line in the graph of FIG. 4 is the relative displacement slider 13 as measured by the interferometer. The voltage and frequency required to cause the slider to hit the disk are empirically determined. The frequency of the AC signal is selected to be approximately the same as the mechanical resonance in the stable flying regime. The mechanical resonance can be different for each slider design and can be determined empirically. The test setup described in FIG. 2 can also be used to determine the resonance. When a selected voltage is applied and the AC frequency is sufficiently near the air-bearing resonance, the response of the slider will be to oscillate vertically with an increasing amplitude until the downward displacement is stopped by hitting the disk as shown by the lower line in the graph of FIG. 4. After the AC signal 35 has been applied for a short time, the flattening of the displacement curve 36 indicates that the head has collided with the disk. The distance between the collision point and the undisturbed fly-height line is a direct measurement of the clearance. In this embodiment the slider is being oscillated around its normal fly-height at its normal resonant frequency until the amplitude of the downward oscillation is limited by hitting the disk. The use of the resonance allows a lower voltage to be used and, therefore, allows the method to be used nondestructively on systems which would otherwise be damaged an AC voltage large enough to cause the slider hit the disk.

An embodiment of the method of the invention which uses the electrical readback signal from the magnetic sensor 14 to measure the clearance will now be described. The same voltage source 21 arrangement shown in FIG. 2 will used, but the interferometer will be omitted. By applying a known electrical current through the sensor the disk drive's electronics convert the change in resistance of the sensor in response to magnetic fields into an output signal. The readback signal derived from the biased magnetic sensor 14 is known to be related to separation between the magnetic sensor and the magnetic recording layer by the Wallace Spacing Loss (WSL) Equation:

$$\frac{A_d}{A_{d'}} = \exp\left[-\frac{2\pi(d-d')}{\lambda}\right]$$

where:
$A_d$=magnetic signal amplitude at magnetic spacing distance d;
$A_{d'}$=magnetic signal amplitude at magnetic spacing distance d'; and lambda ($\lambda$)=write frequency.

The relative value (d–d') in the WSL equation becomes an absolute value for the fly-height when d' is known to be the surface of the disk and d is the normal fly-height. Therefore, as in the method described above, a stable fly-height is achieved using the disk drive or test stand and a measurement is made of the magnitude ($A_d$) of the readback signal from the magnetic sensor for a recorded signal of a known frequency. This measurement can be made by connecting external equipment to the appropriate leads on the suspension or other point in the disk drive's wiring or the measurement can be made by the disk drive's onboard electronics and firmware where such capability is included in the drive's design. The slider is then driven to hit the disk surface using either the DC or AC voltage method described above. The measurement of the derived output of the magnetic sensor for the recorded signal is made at the point where the slider is in contact with the disk is $A_{d'}$. Given $A_d$ and $A_{d'}$ and the known write frequency $\lambda$ the calculation of the clearance spacing is straightforward. The point at which the slider contacts the disk is determined by observing the sensor output and noting the boundary condition in the output. The output signal will increase to a maximum value and flatten out when the slider hits the surface. It should be noted that even when the slider is in contact with the disk, there is an appreciable separation between the sensor and the magnetic material in the disk due to the overcoat layers typically on both the slider and the disk.

Commercially available interferometers have picometer resolution; therefore, the clearance measurement using the interferometer with the method of the invention is very accurate. The method of the invention can be used with any type of disk including production disk installed in functioning disk drives which is an advantage over prior methods that require glass disks. The in situ testing using the invention also allows the effects of the lube and disk texturing to be measured; as well as, allowing measurements on relatively older systems to see how the clearance changed over a period of time.

Figure 5:
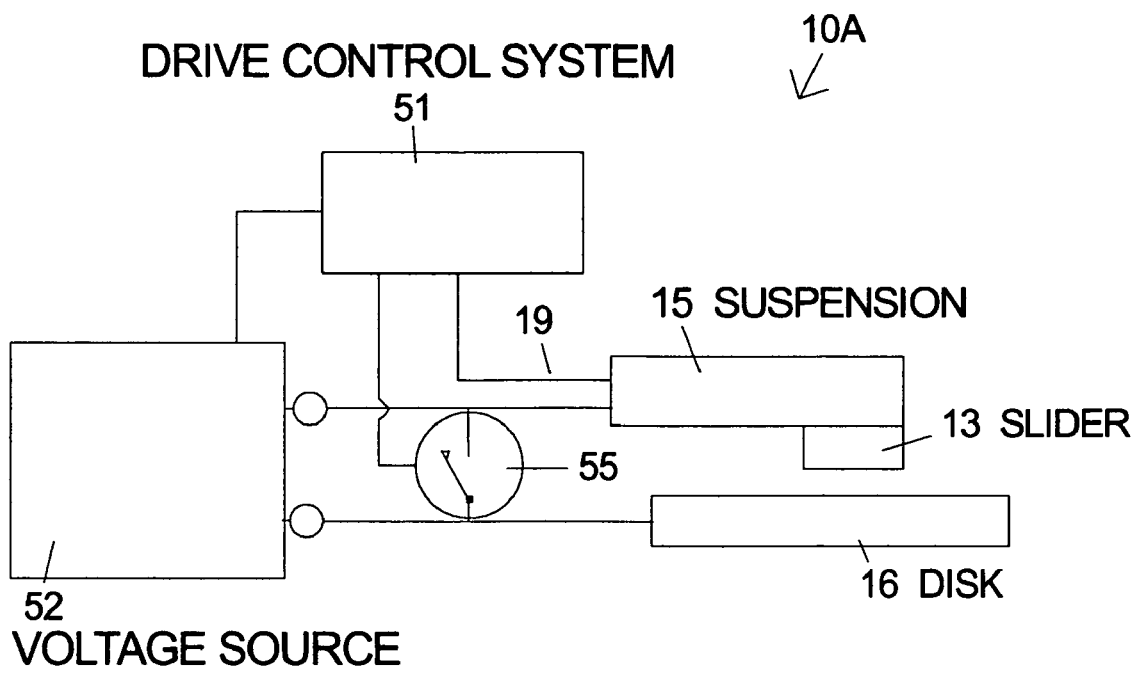
FIG. 5 is an illustration of selected components of a disk drive designed to make a measurement of the clearance according to the invention.

A disk drive 10A is illustrated in FIG. 5 which is designed to allow an embodiment of the method of the invention to be used without requiring alteration or removal of the cover. The disk drive will use the readback signal from the magnetic sensor for the measurement. The prior art drive control systems include one or more microprocessors, nonvolatile memory for storing firmware programs, voltage sources and analog-to-digital (A/D) converters for measuring selected voltages. The drive control system 51 according to the invention is modified to include means for controlling a voltage source 52 to apply the voltage to induce the slider 13 to hit the disk 16. Either the DC pulse method or the AC signal method described above can be implemented in the drive. Switch 55 is included to allow the common ground between the slider and disk to be separated during the measurement. Switch 55 is preferably programmable by the drive control system 51, but could be a manual switch or jumper accessible to a technician. The derived signal from the magnetic sensor in the slider 13 is obtained through wire pair 19 and initially processed in conventional manner. The sequence of events for the measurement is controlled by the firmware in drive control system 51 and is preferably triggered by a command received from a host computer or test station through the prior art communications interface (not shown) on the drive. The visual observations described above which a technician can use to detect the point at which the slider impacts the disk can be automated in the drive control system 51 using standard signal processing techniques. The conversion of the two measured output levels $A_d$ and $A_{d'}$ using the WSL equation can be performed by the drive control system 51. The resulting clearance measurement can be communicated to host. Alternatively, the disk drive can periodically make its own measurements as part of a predictive failure analysis program and respond to low values.

Figure 6:
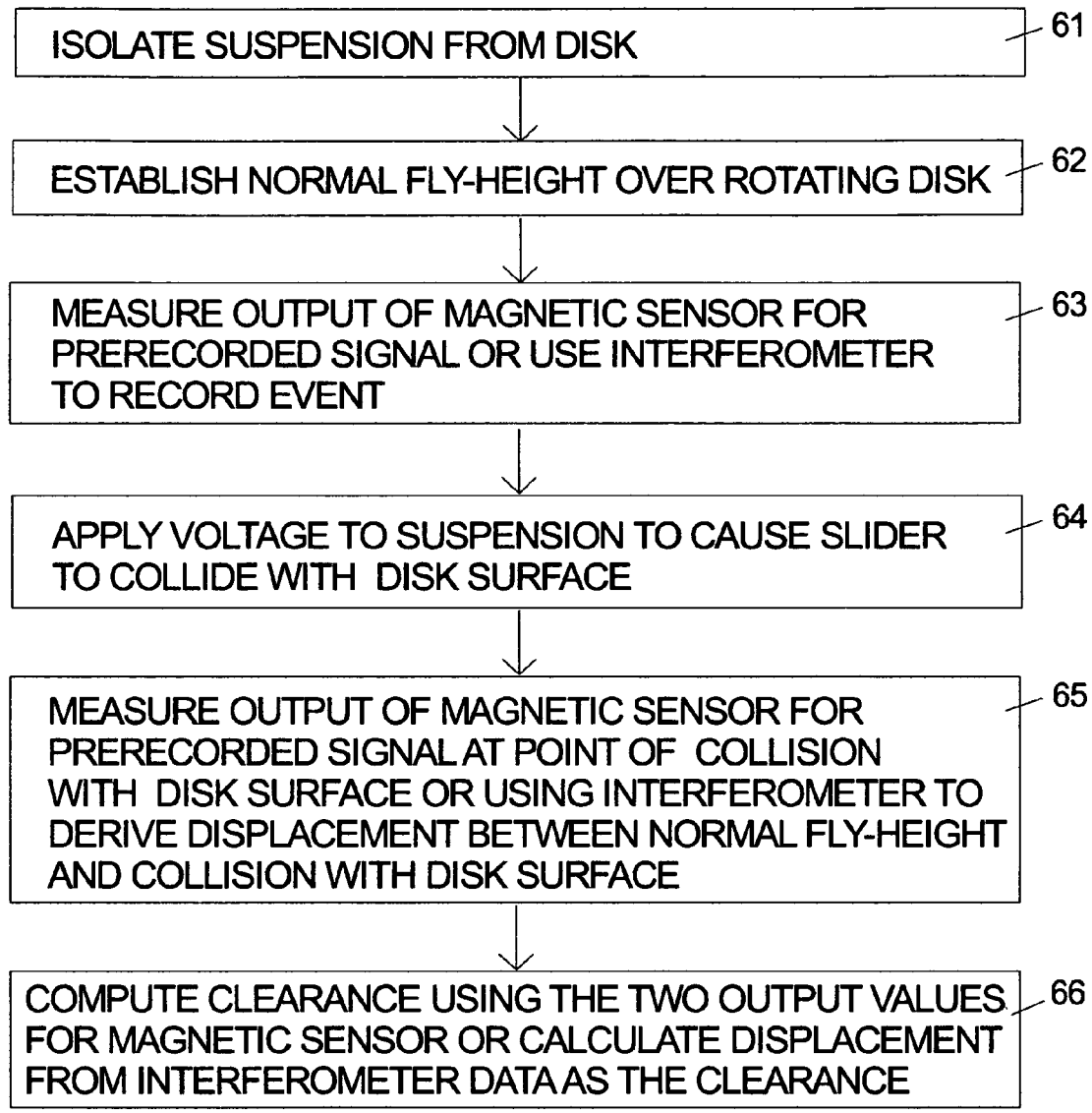
FIG. 6 is a flowchart of the steps in an embodiment of the method of the invention.

FIG. 6 gives a flowchart of the method steps according to selected embodiments of the invention. The common connection, if any, between the suspension and the slider is broken to electrically isolate the suspension and the attached slider 61. If the measurement is being made in test fixture where the suspension is electrically isolated or in a disk drive where no common connection exists, then this initial step is omitted. The normal fly-height of the slider is established by flying the slider over a rotating disk 62. The baseline for the measurement at the normal fly-height is established by either measuring the readback signal from the magnetic sensor for a prerecorded signal or using an interferometer to monitor the vibrational displacement of the slider 63. A voltage is applied the suspension sufficient to cause the slider to collide with the disk surface 64. The voltage can be a DC pulse or an AC signal. The second measurement is made when the slider is in contact with the disk surface by either measuring the readback signal from the magnetic sensor for the prerecorded signal or using the interferometer to measure the vibrational displacement of the slider 65. If the interferometer is used the clearance is obtained as the displacement between the normal fly-height and the collision or if the output of the magnetic sensor is being used the WSL equation is used to convert the two output values into the clearance 66.

Figure 7:
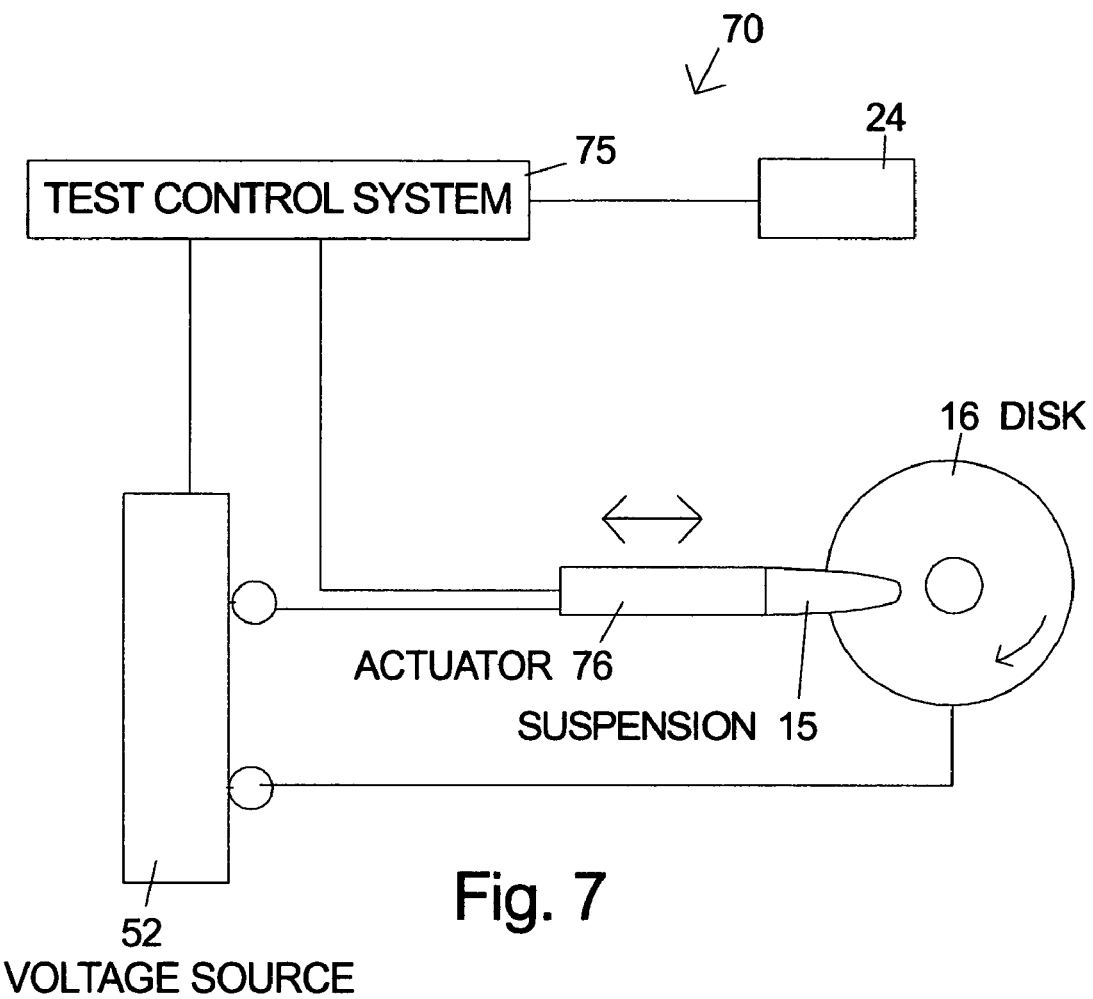
FIG. 7 is a illustration of an embodiment of a test apparatus for measuring the clearance of a slider according to an embodiment of the invention.

FIG. 7 illustrates a test apparatus 70 according to the invention which has a test control system 75 which includes standard test control devices (microprocessors, memory, I/O devices, etc.) and software to conduct the measurements as described. The apparatus is intended to be used with an interferometer 24. A personal computer equipped with I/O cards can be used as the test control system 75. The test control system 75 controls the voltage source 52 which applies the collision inducing voltage to the suspension 15 on which the slider (not shown) is mounted. The measurement data is obtained from the interferometer by test control system 75. The position of the slider over the disk 16 is varied by actuator 76 under the control of the test control system 75. The disk is rotated by a spindle motor (not shown) under the control of the test control system 75. The software programming for the test control system 75 conducts the test by sequencing the events according to the method of the invention as described above. The test apparatus 70 can conduct multiple measurements at a set of selected positions around the disk. Use of the pulse method described above is preferred in this embodiment, since it provides a way to control the timing and, therefore, the angular location on the disk where the clearance will be measured.

The method of the invention has been described with respect to particular embodiments, but other uses and applications for the measurement techniques according to the invention will be apparent to those skilled in the art.

The invention claimed is:

1. A method of measuring a clearance separating a surface of a disk and a slider comprising the steps of:
    (a) rotating the disk at a rate sufficient to form an air-bearing and cause the slider to achieve a fly-height;
    (b) applying a voltage between a suspension supporting the slider and the disk sufficient to cause the slider to collide with the surface of the disk; and
    (c) measuring a displacement of the slider between the fly-height and the surface of the disk.

2. The method of claim 1 wherein the step of measuring a displacement comprises using an interferometer.

3. The method of claim 1 wherein the step of applying a voltage further comprises applying a voltage pulse.

4. The method of claim 1 wherein the step of applying a voltage further comprises applying an AC voltage signal.

5. The method of claim 4 wherein the AC voltage signal has a frequency approximately equal to an air-bearing resonance of the slider.

6. The method of claim 1 further comprising the step of repeatedly executing steps (b) through (c) at a plurality of positions on the surface of the disk to obtain a set of measurements.

7. A disk drive comprising:
    a slider including a magnetic sensor mounted on a suspension;
    a voltage source connected to the suspension; and
    a control system including:
        means for measuring a first value of an amplitude of a readback signal from the magnetic sensor for a prerecorded magnetic pattern on the disk;
        means for using the voltage source to apply a selected voltage to the suspension when the slider is flying over a rotating disk, the selected voltage causing the slider to collide with a surface of the disk;
        means for measuring a second value of the amplitude of the readback signal from the magnetic sensor for the prerecorded magnetic pattern on the disk when the slider collides with the surface of the disk after the selected voltage has been applied; and
        means for calculating a clearance of the slider using the first and second values of the amplitude of the readback signal.

8. The disk drive of claim 7 wherein the voltage source generates a voltage pulse.

9. The disk drive of claim 7 wherein the voltage source generates an AC voltage signal with a frequency approximately equal to a resonant frequency of the slider while flying.

10. The disk drive of claim 7 further comprising means for temporarily disconnecting an electrical connection between the suspension and the disk in response to the control system.

11. A method of measuring a clearance between a slider and a magnetic disk comprising the steps of:
    (a) rotating the disk at a rate sufficient to form an air-bearing and cause the slider to achieve a fly-height;
    (b) measuring a first value of an amplitude of a readback signal from a magnetic sensor in the slider for a prerecorded magnetic pattern on the disk;
    (c) applying a voltage between a suspension supporting the slider and the disk sufficient to cause the slider to collide with the surface of the disk; and
    (d) measuring a second value of the amplitude of the readback signal from the magnetic sensor in the slider for the prerecorded magnetic pattern on the disk when the slider collides with the surface of the disk after the selected voltage has been applied; and
    (e) calculating a clearance of the slider using the first and second values of the amplitude of the readback signal.

12. The method of claim 11 wherein the voltage is a voltage pulse.

13. The method of claim 11 wherein the voltage is an AC voltage signal.

14. The method of claim 13 wherein the AC voltage signal has a frequency approximately equal to a resonant frequency of the slider while flying.

* * * * *